US006565208B1

(12) United States Patent
Lee

(10) Patent No.: US 6,565,208 B1
(45) Date of Patent: May 20, 2003

(54) TEMPLE PLATE PAD ADAPTED TO SECURELY ENGAGE WITH A TEMPLE PLATE OF A PAIR OF EYEGLASSES

(76) Inventor: Shu-Min Lee, No. 57, Kao-Kuang-Liu St., Yungkang City, Tainan Hsien (TW)

( * ) Notice: Subject to any disclaimer, the term of this patent is extended or adjusted under 35 U.S.C. 154(b) by 0 days.

(21) Appl. No.: 10/163,647

(22) Filed: Jun. 6, 2002

(51) Int. Cl.[7] ................................................. G02C 5/16
(52) U.S. Cl. ...................................... 351/122; 351/123
(58) Field of Search ................................ 351/122, 123, 351/111, 119, 118, 41, 121; 2/426, 448

(56) References Cited

U.S. PATENT DOCUMENTS 3,953,114 A * 4/1976 Bidgood ...................... 351/123

* cited by examiner

Primary Examiner—Hung Xuan Dang
(74) Attorney, Agent, or Firm—William E. Pelton, Esq.

(57) ABSTRACT

A temple plate pad adapted to a temple plate of a pair of eye glasses has a bottom plate and a tapered body securely engaged with the bottom plate and adapted to securely engage with the temple plate. The bottom plate has a width larger than a width of the tapered body so that after the tapered body is attached to the bottom plate, an inverted T shape is formed. Whereby the T shaped temple plate pad is able to receive loading due to the width of the bottom plate being larger than the width of the tapered body.

2 Claims, 5 Drawing Sheets

TEMPLE PLATE PAD ADAPTED TO SECURELY ENGAGE WITH A TEMPLE PLATE OF A PAIR OF EYEGLASSES

BACKGROUND OF THE INVENTION

1. Field of the Invention

The present invention relates to an eye glasses pad, and more particularly to a T shaped pad adapted to a temple plate of a pair of glasses.

2. Description of Related Art

Eye glasses have been used for years by people to correct their eye sights. As the nature of work for many people has changed from a manual nature to a more clerical type, using eyeglasses for long periods of time has become increasingly necessary. Accordingly, it is necessary for the glasses to be comfortable, especially when worn for long periods.

To obviate the discomfort, manufacturers apply a slip-proof pad to the nose support of the eye glasses so that the eye glasses stay in position regardless of the movement of the user and also provide a cushion effect to the user. Although adding the pad to the nose support does provide comfort to the user in some extent, the temple plate which engages the most facial part of the user still bothers the user due to the material chosen to make the temple plate. As well known in the art, the temple plate normally is made of metal, plastic, alloy or the combination thereof. Because the temple plate of the eye glasses has to be hard enough to support the weight of the eye glasses and in the meantime it has to be soft enough not to bring discomfort to the user, manufacturers of the eye glasses use a cushioning pad (82) attached to a side (81) of the temple plate (80), as shown in FIGS. 5 and 6. Because the cushioning pad (82) securely encloses a portion of the temple plate (80), there is hardly any cushion provided to the user. Therefore, in order to obviate the drawback, manufacturer introduces an improved temple plate (83) with a pad (85) attached to the temple plate (83), as shown in FIG. 7. The temple plate (83) has a rib (84) longitudinally formed on a bottom of the temple plate (83) and thus defines two rooms (86) beside the rib (84). The pad (85) is securely attached to the rib (84) so that the pad (85) is able to move toward both sides of the rib (84), which provides comfort to the user, especially when the user is in movement. However, it is noted that the engagement between the temple plate (83) and the pad (85) suggests only the sides of the pad (85) are able to be deformed so as to provide cushion to the user. That is, because the rib (84) is an integral part of the temple plate (83), the rib (84) has no or little contribution in the provision of comfort.

To overcome the shortcomings, the present invention tends to provide an improved eye glasses temple plate pad to mitigate and obviate the aforementioned problems.

SUMMARY OF THE INVENTION

The primary objective of the present invention is to provide an improved eye glasses temple plate pad so that the user is able to feel comfortable when wearing the eye glasses.

In order to accomplish the foregoing objective, the temple plate pad of a pair of glasses is configured to be T shaped. Using the feature of the width at one side being smaller than the width of the other side, the temple plate pad is able to have large deformation so that the user feels much more comfortable when compared with the conventional pad.

Other objects, advantages and novel features of the invention will become more apparent from the following detailed description when taken in conjunction with the accompanying drawings.

DETAILED DESCRIPTION OF THE PREFERRED EMBODIMENT

Figure 1:
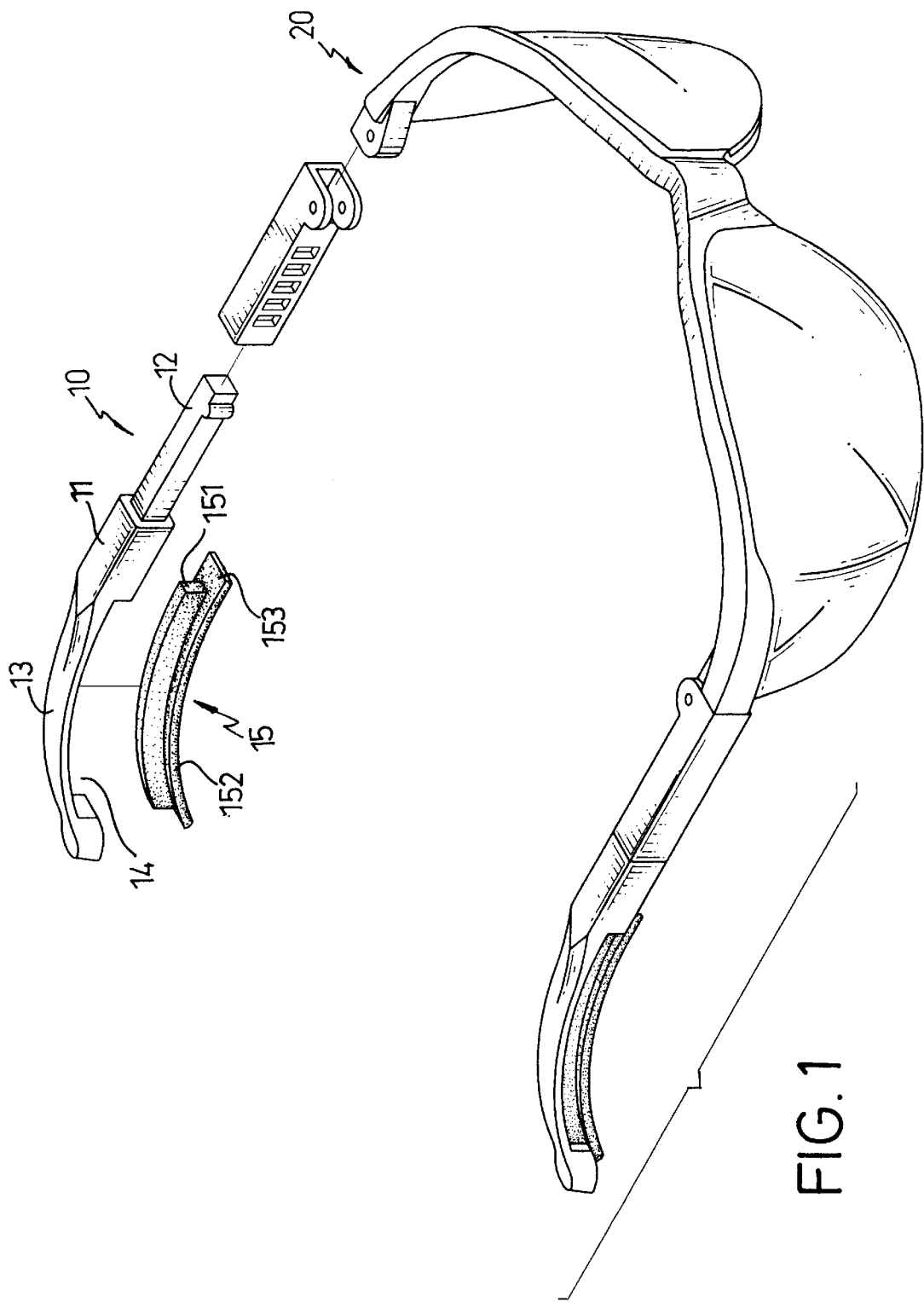
FIG. 1 is an exploded perspective view of the eye glasses temple plate and a pad adaptable to the temple plate.

With reference to FIG. 1, an eye glasses (20) has a temple plate (10) with a body (11) which has an extension (12) adapted to be securely connected to the eye glasses (20) and a rear portion (13) integrally formed with the body (11). The rear portion (13) of the temple plate (10) has a cutout (14) defined in a bottom face of the rear portion (13) of the temple plate (10). A pad (15) is provided to be securely engaged with the temple plate (10) and is received in the cutout (14).

The pad (15) is shaped as an inverted T in cross section and has a bottom plate (152) and a tapered body (151) securely engaged with the bottom plate (152). The bottom plate (152) has a width larger than a width of the tapered body (151) so that after the tapered body (151) is attached to the bottom plate (152), a T shape is formed. Further, the bottom plate (152) has a length longer than a length of the tapered body (151) so that two tabs (153) are formed on two respective distal ends of the bottom plate (152).

Figure 2:
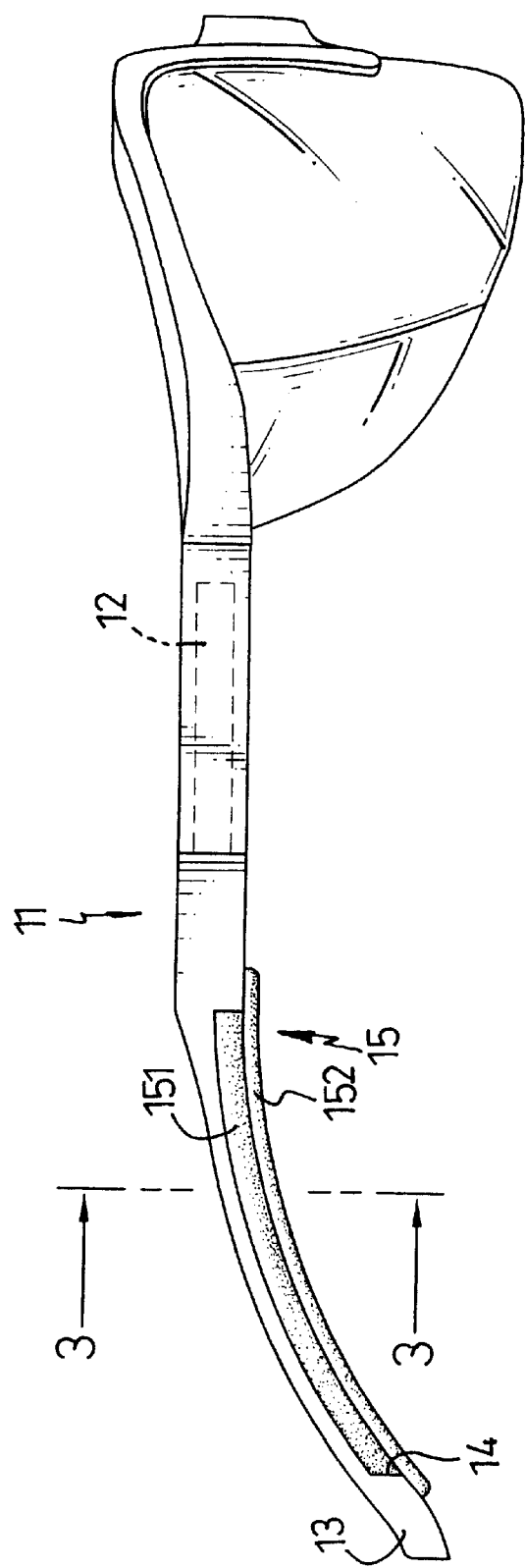
FIG. 2 is a plan view showing the temple plate pad of the present invention fitted to the eye glasses.
Figure 3:
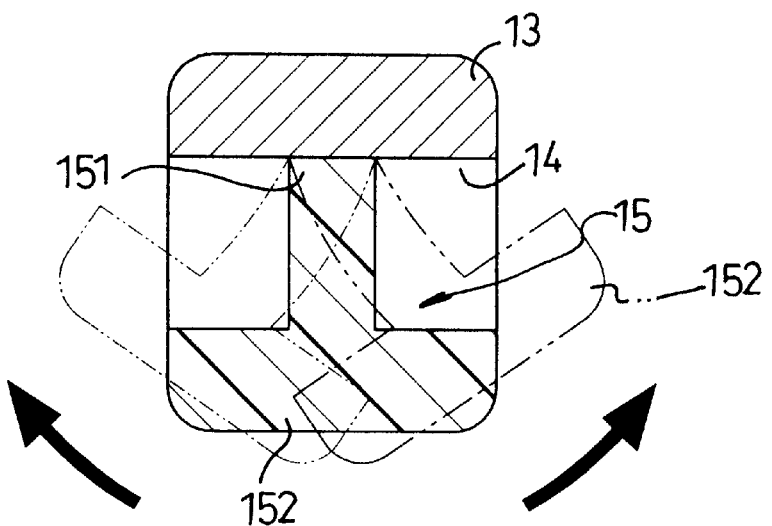
FIG. 3 is a cross sectional view showing the structure of the temple plate pad fitted to the eye glasses.
Figure 7:
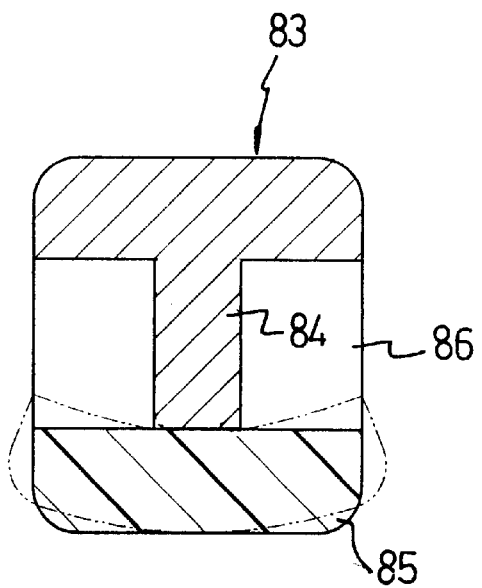
FIG. 7 is a cross sectional view of another embodiment of the conventional eye glasses in combination with a pad.
Figure 4:
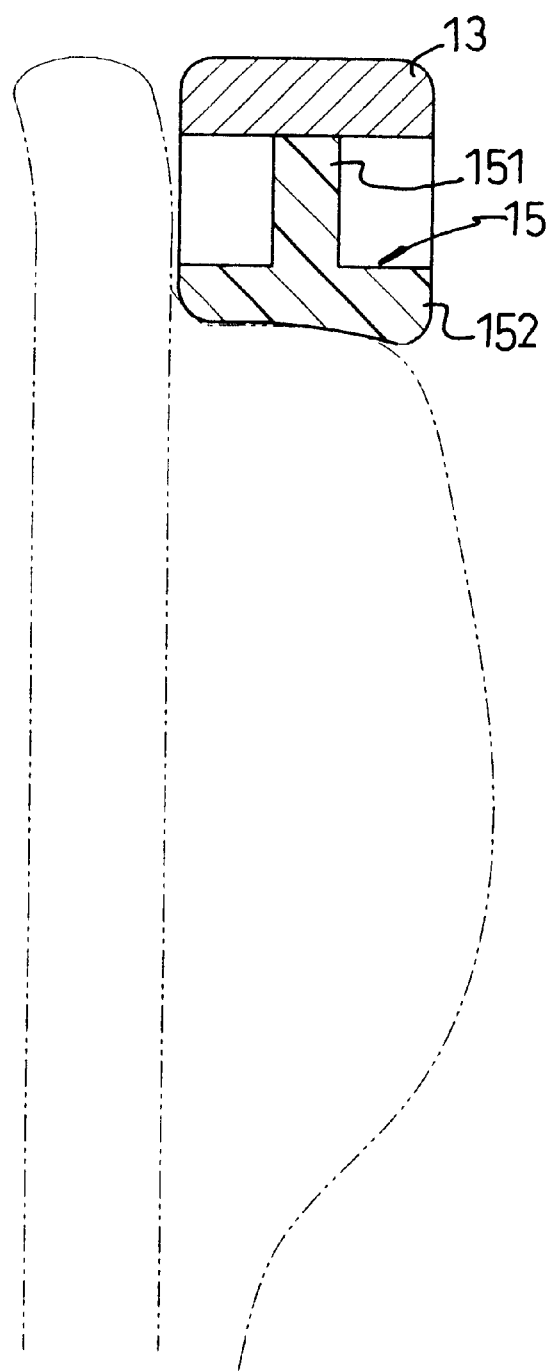
FIG. 4 is a schematic cross sectional view of the eye glasses pad fitted to an ear of the user.
Figure 5:
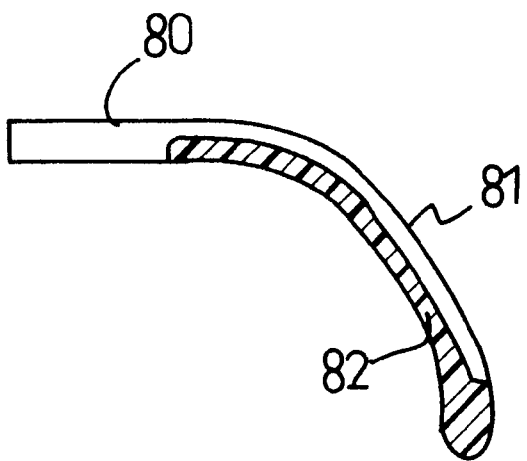
FIG. 5 is a conventional temple plate with partial in section.
Figure 6:
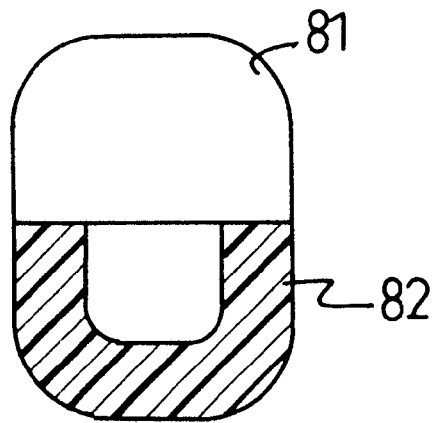
FIG. 6 is a cross sectional view of the temple plate in FIG. 5.

With reference to FIGS. 2, 3 and 4, the tapered body (151) securely engages with a bottom face defining the cutout (14) of the temple plate (10). Because the length of the bottom plate (152) is longer than the tapered body (151), the two tabs (153) respectively extend out of the cutout (14) of the temple plate (10) and then engage with the temple plate (10).

When the eye glasses of the present invention are in use, the T shaped temple plate pad (15) is able to receive a greater load because the T shaped structure has more deformation than the conventional pad. That is, the bottom plate (152) as well as the tapered body (151) is able to deform when a load is applied to the pad (15).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A temple plate pad adapted to securely engage with a temple plate of a pair of eye glasses, the temple plate pad comprising:

a bottom plate and a tapered body securely engaged with the bottom plate and adapted to securely engage with the temple plate, wherein the bottom plate has a width larger than a width of the tapered body so that after the tapered body is attached to the bottom plate, an inverted T shape is formed to provide deformation when the temple plate pad is adapted to be worn, and wherein the bottom plate has a length longer than a length of the tapered body so that at least one tab is formed on a distal end of the bottom plate, whereby the inverted T shaped temple plate pad is able to receive loading due to the width of the bottom plate begin larger than the width of the tapered body.

2. A pair of eyeglasses having a temple plate and a temple plate pad attached thereto, the temple plate pad comprising a bottom plate having a tapered body extending laterally therefrom along its length and connecting said bottom plate to the temple plate, said bottom plate and tapered body having an inverted T shape to define a pair of spaces between said bottom plate and the temple plate on opposite sides of said tapered body, said bottom plate being deflectable into at least one of said spaces when the eyeglasses are being worn.

* * * * *